Patented Aug. 7, 1945

2,380,940

UNITED STATES PATENT OFFICE 2,380,940

PHOTOGRAPHIC EMULSION

Burt H. Carroll and John Spence, Rochester, N. Y., assignors to Eastman Kodak Company, Rochester, N. Y., a corporation of New Jersey No Drawing. Application January 14, 1943,
Serial No. 472,340

12 Claims. (Cl. 95—7)

This invention relates to sensitized photographic emulsions and more particularly to spectrally (optically) sensitized emulsions.

It is known that the distribution of spectral sensitivity of certain spectrally sensitized emulsions can be altered and an increase of sensitivity obtained in some spectral region by incorporating certain additional sensitizing dyes in the spectrally sensitized emulsions. (See United States Patents 2,158,882, dated May 16, 1939, and 2,159,667, dated May 23, 1939.) The effect thus obtained has come to be known as supersensitization. Supersensitization of certain spectrally sensitized emulsions can also be effected by incorporating certain substantially colorless heterocyclic bases in the spectrally sensitized emulsions. (See United States Patent 2,177,635, dated October 31, 1939.) Supersensitization differs from hypersensitization which involves treatment of finished films or plates, an operation which normally reduces the pAg and increases the pH of the emulsions with consequent decrease in stability.

We have now found a new method for supersensitizing spectrally sensitized emulsions, which not only does not reduce the stability of the emulsions, but is especially valuable as a means of giving panchromatic sensitized emulsions of high speed and good color balance.

It is, accordingly, an object of our invention to provide new supersensitized photographic emulsions. A further object is to provide a process for preparing such emulsions. Still other objects will become apparent hereinafter.

In accordance with the invention, a photographic silver halide emulsion spectrally sensitized with a cyanine dye is supersensitized by incorporating in the emulsion certain aromatic nitriles, viz. one or more of those represented by the following general formula:

D—X wherein D represents an aromatic nucleus devoid of nitro groups and acidic groups, e. g. sulfonic acid groups (and their salt forms) and sulfinic acid groups (and their salt forms). The nitriles in which D represents an aromatic nucleus of the benzene series are advantageously employed. Exemplary of the aromatic nitriles are the following:

Benzonitrile
p-Chlorobenzonitrile
p-Bromobenzonitrile
p-Methoxybenzonitrile
2,5-dimethoxybenzonitrile
γ-Phenoxybutyronitrile
α-Naphthonitrile
β-Naphthonitrile
Hydroquinone di-β-cyanoethyl ether
2,3-dicyanohydroquinone dimethyl ether The majority of cyanine dyes which are supersensitized by the aromatic nitriles are characterized by the fact that the dyes produce two types of sensitization depending upon conditions. Such different types of sensitization are described by Leermakers, Carroll and Staud, J. Chem. Physics, 5, 878 (1937) and by G. Schwarz, Sci. et Ind. Phot. 10, 233 (1939). When certain cyanine dyes of this type are used as sensitizers in low concentrations, they exhibit a sensitizing maximum displaced about 20 to 50 mu toward the red from the absorption maximum in ethyl alcohol solution. On increasing the concentration of the dye, or upon digesting the emulsion containing the dye in the lower concentration, or both, a second maximum of sensitization develops at longer wavelengths, which may be accompanied by an increase in total optical sensitization. In some cases a decrease in sensitivity at the first maximum can be detected. These phenomena are consistent with the hypothesis of two states of the sensitizing dye in an equilibrium which is controlled by concentration. The aromatic nitriles favor the formation of a second maximum. The increase in sensitivity apparently corresponds to increased conversion of the dye to the state corresponding to the second maximum of sensitization. In some cases the effect appears to correspond to a more complete conversion than has ever been previously obtained without a supersensitizer and in any case the long wavelength sensitivity is better than can be obtained from the same concentration of dye without the aromatic nitrile.

The following are exemplary of the cyanine dyes which can be supersensitized in accordance with our invention:

1,1'-diethyl-6,6'-dimethyl-2,2'-cyanine iodide
1',3-diethylselena-2'-cyanine iodide
3,3'-diethyl-9-methylthiacarbocyanine bromide
3,3'- diethyl - 9 - methylselenacarbocyanine bromide
9-ethyl-3,3'-dimethyl- 4,5,4',5'-dibenzothiacarbocyanine bromide The sensitizing dyes can be employed in any desired concentration. Ordinarily from 10 to 30 mg. of dye per liter of emulsion will suffice to produce the optimum sensitizing effects. The methods of incorporating sensitizing dyes in emulsions is well known to those skilled in the art. Ordinarily, it is preferable to dissolve the dye in a water-miscible solvent, such as methanol, before incorporating in the emulsion.

The amount of the aromatic nitrile used is not critical. Usually the full supersensitizing effect is developed at a concentration of from 0.2 to 2 grams per liter of emulsion, but larger or smaller amounts are sometimes advantageous. The aromatic nitriles can be added with, before, or after the sensitizing dye or dyes. The aromatic nitriles are preferably, but not necessarily, diluted with a water-miscible solvent, such as methanol, before incorporation in the emulsion. One or more aromatic nitriles can be employed.

The following examples will serve to illustrate results obtained in accordance with the invention:

Example 1

A fast negative gelatino-silver-bromiodide developing-out emulsion was sensitized with 3,3'-diethyl-9-methylselena-carbocyanine bromide (20 mg. per liter of emulsion) and to separate batches of the spectrally sensitized emulsion were added various aromatic nitriles. A portion of the spectrally sensitized emulsion was exposed without, and other portions with the addition of the aromatic nitriles, through red (Wratten 25) and minus blue (Wratten 12) filters, the latter giving a good measure of total spectral (optical) sensitization.

| Aromatic nitrile (g./liter of emulsion) | Red | | Minus blue | | Fog |
| --- | --- | --- | --- | --- | --- |
| | Speed | Gamma | Speed | Gamma | |
| None | 130 | 1.30 | 725 | 1.34 | .05 |
| Benzonitrile, 1.25 | 178 | 1.36 | 615 | 1.48 | .05 |
| p-Bromobenzo-nitrile, 1.25 | 210 | 1.32 | 690 | 1.45 | .05 |
| 2,5-dimethoxy-benzo-nitrile, 1.25 | 255 | 1.35 | 605 | 1.55 | .05 |

Example 2

Another fast negative gelatino-silver-bromiodide developing-out emulsion was sensitized with 3,3'-diethyl-9-methyl-selenacarbocyanine bromide (20 mg. per liter of emulsion) and to the spectrally sensitized emulsion was added γ-phenoxybutyronitrile. A portion of the spectrally sensitized emulsion was exposed without, and another portion with the addition of the aromatic nitrile, through red (Wratten 25) and minus blue (Wratten 12) filters, the latter giving a good measure of total optical sensitization.

| γ-phenoxybutyronitrile (g./liter of emulsion) | Red | | Minus blue | | Fog |
| --- | --- | --- | --- | --- | --- |
| | Speed | Gamma | Speed | Gamma | |
| None | 89 | 1.71 | 405 | 1.54 | .10 |
| 1.25 | 148 | 1.74 | 415 | 1.63 | .07 |

Example 3

A fast negative gelatino-silver-bromiodide developing-out emulsion was sensitized with 9-methyl-3,3'-diethyl-4,5,4',5'-dibenzothiacarbocyanine bromide (15 mg. per liter of emulsion) and to the spectrally sensitized emulsion was added benzonitrile. A portion of the spectrally sensitized emulsion was exposed without, and another portion with the addition of the nitrile, through red (Wratten 25) and minus blue (Wratten 12) filters, the latter giving a good measure of total optical sensitization.

| Benzonitrile (g./liter of emulsion) | Red | | Minus blue | | Fog |
| --- | --- | --- | --- | --- | --- |
| | Speed | Gamma | Speed | Gamma | |
| None | 51.5 | 1.48 | 235 | 1.52 | |
| 2.5 | 81.5 | 1.50 | 240 | 1.60 | |

Some of the aromatic nitriles, while effecting an increase of sensitivity in some spectral region, cause a decrease in others, and must be employed with this fact in mind. In the above examples, the minus blue speed demonstrates whether or not there is a loss of total spectral sensitivity owing to a decrease of speed in some spectral region. Some of the aromatic nitriles while effecting supersensitization and changing the distribution of spectral sensitivity, cause overall desensitization of the emulsion. Examples of such aromatic nitriles are following: p-methoxy-benzonitrile, α-naphthonitrile and β-naphthonitrile.

Our invention is primarily directed to the customarily employed gelatino-silver-halide developing-out emulsions, such as gelatino-silver-chloride, gelatino-silver-chlorobromide, gelatino-silver-bromide and gelatino-silver-bromiodide developing-out emulsions.

Emulsions prepared in accordance with our invention can be coated in the usual manner upon any desired support, such as cellulose nitrate support, cellulose acetate support, polyvinyl acetal resin support, metal support, glass support or paper support.

What we claim as our invention and desire to be secured by Letters Patent of the United States is:

1. A photographic silver halide emulsion spectrally sensitized with a cyanine dye containing, as a supersensitizer, an aromatic nitrile of the following general formula:

$$D—X$$

wherein D represents an aromatic nucleus devoid of nitro groups and acidic groups and salt forms of said acidic groups and X represents a member selected from the group consisting of cyano groups, cyanoalkyl groups and cyanoalkoxy groups.

2. A photographic silver halide developing-out emulsion spectrally sensitized with a cyanine dye containing, as a super-sensitizer, an aromatic nitrile of the following general formula:

$$D—X$$

wherein D represents an aromatic nucleus devoid of nitro groups and acidic groups and salt forms of said acidic groups and X represents a member selected from the group consisting of cyano groups, cyanoalkyl groups and cyanoalkoxy groups.

3. A photographic gelatino-silver-halide emulsion spectrally sensitized with a cyanine dye containing, as a super-sensitizer, an aromatic nitrile of the following general formula:

$$D—X$$

wherein D represents an aromatic nucleus devoid of nitro groups and acidic groups and salt forms of said acidic groups and X represents a member selected from the group consisting of cyano groups, cyanoalkyl groups and cyanoalkoxy groups.

4. A photographic gelatino-silver-halide developing-out emulsion spectrally sensitized with a cyanine dye containing, as a supersensitizer, an aromatic nitrile of the following general formula:

$$D—X$$

wherein D represents an aromatic nucleus devoid of nitro groups and acidic groups and salt forms of said acidic groups and X represents a member selected from the group consisting of cyano groups, cyanoalkyl groups and cyanoalkoxy groups.

5. A photographic gelatino-silver-halide developing-out emulsion spectrally sensitized with a cyanine dye which produces a maximum of spectral sensitivity in the emulsion at one concentration and at a higher concentration, or upon digestion of the emulsion containing the dye at the lower concentration, produces a second maximum of spectral sensitivity at a wavelength longer than that of the first maximum said emulsion containing, as a supersensitizer, an aromatic nitrile of the following general formula:

D—X wherein D represents an aromatic nucleus devoid of nitro groups and acidic groups and salt forms of said acidic groups and X represents a member selected from the group consisting of cyano groups, cyanoalkyl groups and cyanoalkoxy groups.

6. A photographic gelatino-silver-halide developing-out emulsion spectrally senitized with a cyanine dye which produces a maximum of spectral sensitivity in the emulsion at one concentration and at a higher concentration, or upon digestion of the emulsion containing the dye at the lower concentration, produces a second maximum of spectral sensitivity at a wavelength longer than that of the first maximum said emulsion containing, as a supersensitizer, an aromatic nitrile of the following general formula:

D—X wherein D represents an aromatic nucleus of the benzene series devoid of nitro groups and acidic groups and salt forms of said acidic groups and X represents a member selected from the group consisting of cyano groups, cyanoalkyl groups and cyano-alkoxy groups.

7. A photographic gelatino-silver-halide developing-out emulsion spectrally sensitized with a cyanine dye which produces a maximum of spectral sensitivity in the emulsion at one concentration and at a higher concentration, or upon digestion of the emulsion containing the dye at the lower concentration, produces a second maximum of spectral sensitivity at a wavelength longer than that of the first maximum said emulsion containing, as a supersensitizer, an aromatic nitrile of the following general formula·

D—CN wherein D represents an aromatic nucleus of the benzene series devoid of nitro groups and acidic groups and salt forms of said acidic groups.

8. A photographic gelatino-silver-halide developing-out emulsion spectrally sensitized with a cyanine dye which produces a maximum of spectral sensitivity in the emulsion at one concentration and at a higher concentration, or upon digestion of the emulsion containing the dye at the lower concentration, produces a second maximum of spectral sensitivity at a wavelength longer than that of the first maximum said emulsion containing, as a supersensitizer, an aromatic nitrile of the following general formula:

D—X wherein D represents an aromatic nucleus of the benzene series devoid of nitro groups and acidic groups and salt forms of said acidic groups and X represents a cyanoalkyl group.

9. A photographic gelatino-silver-halide developing-out emulsion spectrally sensitized with a cyanine dye which produces a maximum of spectral sensitivity in the emulsion at one concentration and at a higher concentration, or upon digestion of the emulsion containing the dye at the lower centration, produces a second maximum of spectral sensitivity at a wavelength longer than that of the first maximum said emulsion containing, as a supersensitizer, an aromatic nitrile of the following general formula:

D—X wherein D represents an aromatic nucleus of the benzene series devoid of nitro groups and acidic groups and salt forms of said acidic groups and X represents a cyanoalkoxy group.

10. A photographic gelatino-silver-halide developing-out emulsion spectrally sensitized with a cyanine dye which produces a maximum of spectral sensitivity in the emulsion at one concentration and at a higher concentration, or upon digestion of the emulsion containing the dye at the lower concentration, produces a second maximum of spectral sensitivity at a wavelength longer than that of the first maximum said emulsion containing, as a supersensitizer, benzonitrile.

11. A photographic gelatino-silver-halide developing-out emulsion spectrally sensitized with a cyanine dye which produces a maximum of spectral sensitivity in the emulsion at one concentration and at a higher concentration, or upon digestion of the emulsion containing the dye at the lower concentration, produces a second maximum of spectral sensitivity at a wavelength longer than that of the first maximum said emulsion containing, as a supersensitizer, γ-phenoxybutyronitrile.

12. A photographic gelatino-silver-halide developing-out emulsion spectrally sensitized with a cyanine dye which produces a maximum of spectral sensitivity in the emulsion at one concentration and at a higher concentration, or upon digestion of the emulsion containing the dye at the lower concentration, produces a second maximum of spectral sensitivity at a wavelength longer than that of the first maximum said emulsion containing, as a supersensitizer, phenylacetonitrile.

BURT H. CARROLL.
JOHN SPENCE.